United States Patent [19]

Bennett

[11] 4,128,409

[45] Dec. 5, 1978

[54] CHLORINE RECOVERY PROCESS

[75] Inventor: Anthony E. Bennett, Stockton-on-Tees, England

[73] Assignee: Tioxide Group Limited, Billingham, England

[21] Appl. No.: 766,810

[22] Filed: Feb. 8, 1977

[30] Foreign Application Priority Data

Feb. 25, 1976 [GB] United Kingdom .............. 07327/76

[51] Int. Cl.$^2$ .............................................. F25J 3/02
[52] U.S. Cl. ......................................... 62/26; 62/23; 62/39; 62/17
[58] Field of Search .................. 62/23, 38, 39, 26, 17, 62/18

[56] References Cited

U.S. PATENT DOCUMENTS

| 1,876,551 | 9/1932 | Barstow et al. | 62/23 |
| 3,534,562 | 10/1970 | Thijssen | 62/18 |
| 3,643,452 | 2/1972 | Ruhemann et al. | 62/39 |

Primary Examiner—Norman Yudkoff
Attorney, Agent, or Firm—Schuyler, Birch, Swindler, McKie & Beckett

[57] ABSTRACT

Process for the recovery of chlorine from chlorine-containing gas mixtures in a multi-stream heat exchanger wherein the chlorine-containing mixtures are separated from other gases which would solidify or liquify in the process, either before or after compression of the mixture, and is then cooled below the dew-point of chlorine in one stream of the heat exchanger; the liquid and gaseous phases thus produced are then separated and re-passed separately through the heat exchanger, the chlorine passing to recovery and the gas phase to re-cooling before being re-passed once more through the heat exchanger prior to discharge and wherein a predetermined mixture of gaseous and liquid phases is also recycled separately through the heat exchanger before re-compression and return via the heat exchanger to the phase-separation apparatus.

14 Claims, 1 Drawing Figure

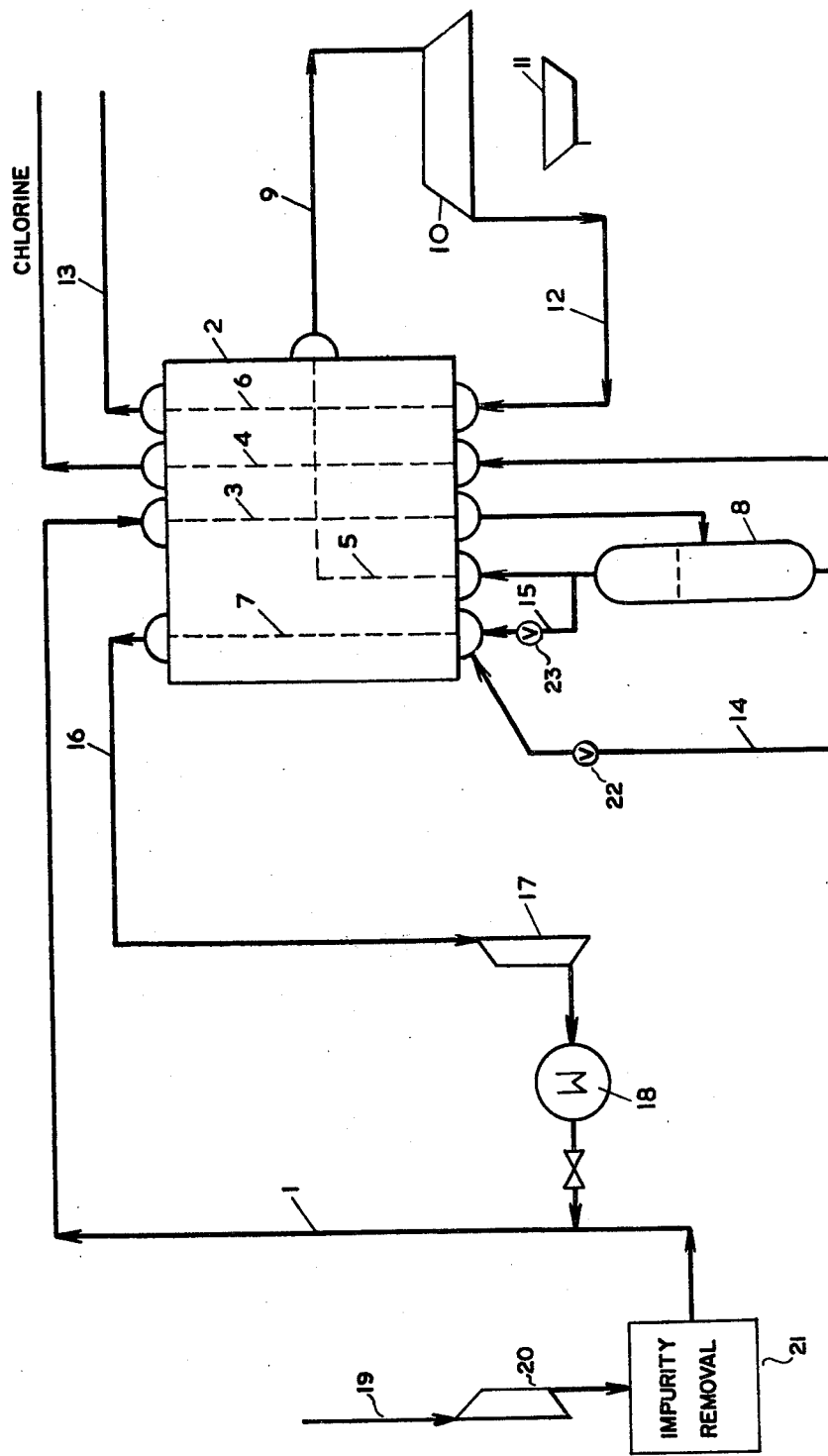

CHLORINE RECOVERY PROCESS

The present invention relates to a process for the recovery of chlorine from chlorine-containing gas mixtures.

Chlorine-containing gas mixtures are produced, for example, in the so-called 'chloride' process for the production of pigmentary titanium dioxide wherein titanium tetrachloride vapour is oxidised at an elevated temperature with an oxidising gas, normally oxygen or an oxygen-containing gas. Such mixtures after the removal of their solid constituents may contain, in addition to chlorine, oxygen (which is normally used in stoichiometric excess in such processes), unreacted metal halides, inert gases (including nitrogen) and/or the products of combustion of a gas such as carbon monoxide or a hydrocarbon gas which may have been burned to supply heat to maintain the reaction. The process of the present invention is applicable to such gas mixtures and to other chlorine-containing gas mixtures.

In such chlorine-containing gas mixtures it is normally necessary to recover the chlorine for re-use and/or to prevent its discharge to atmosphere. In the past recovery has been accomplished either by compression and cooling of the gas mixture after appropriate purification steps have been applied, thereby converting the chlorine to the liquid phase for storage and re-use. An alternative process for the recovery of chlorine is described in British Pat. No. 1,274,710 wherein chlorine is absorbed into liquid titanium tetrachloride, stored as a solution therein and is recovered as required by desorption from the titanium tetrachloride under appropriate conditions of temperature and pressure.

Operation of the previously used processes entails high operating costs and it is an object of the present invention to provide a process whereby such costs are reduced.

Accordingly, the present invention is a process for the recovery of chlorine from chlorine-containing gases comprising the following steps:

(a) removing from the chlorine-containing gas mixture, either before or after step (b) below, gases which, if present in the gas mixture in substantial quantity, would form solids or which would liquify with chlorine in the subsequent process steps (b) compressing the chlorine-containing gas mixture (c) cooling the compressed gas mixture in a multi-stream heat exchanger to a temperature below the dew point of chlorine in the gas mixture but not below $-101°$ C. thereby producing a gas containing liquid chlorine (d) withdrawing the cooled gas mixture from the heat exchanger and separating the liquid and gaseous phases present in the mixture (e) recirculating chlorine from (d) separately through the heat exchanger and recovering therefrom chlorine for storage and/or re-use (f) circulating cooled and separated gas from step (d) through the heat exchanger, withdrawing the resulting heated gas, externally cooling the gas to a temperature below that obtained in step (c) above but not below $-101°$ C. and thereafter recirculating the cooled gas through the heat exchanger prior to discharge and/or re-use (g) passing through the heat exchanger a mixture of a predetermined composition of gas and liquid from step (d) above, withdrawing the resulting heated gas mixture from the heat exchanger, compressing the heated mixture and either mixing with incoming chlorine-containing gas as in step (a) above or returning the compressed gas mixture separately to the gas/liquid phase separator of step (d) above via the multi-stream heat exchanger wherein the gas mixture is cooled.

As noted previously, the process of the present invention may be applied to any chlorine-containing gas mixture but will be discussed herein with particular reference to the tail gases from the chloride process for the production of pigmentary titanium dioxide. By the term 'tail gases' is meant the gas mixture remaining after the removal of the solids, mainly $TiO_2$, from the gases leaving the reactor in which the titanium tetrachloride has been oxidised.

Such gases are treated to remove gases which, if present in substantial quantities, are likely to form solids and/or which are likely to liquify with the chlorine, in the subsequent processing steps. Such gases are normally those which form solids at the reduced temperatures and/or increased pressures to which the gases are subjected during recovery. For example, carbon dioxide is likely to form a solid and metal halide vapour such as titanium tetrachloride, if present, may also cause problems and, if so, should be removed. These gases may be removed by conventional techniques, for example carbon dioxide by known absorption techniques and metal halide vapour may, for example, be removed by washing the tail gases with liquid chlorine. Other gases which may liquify with the chlorine in the recovery process include hydrocarbons, for example propane or propene.

It is necessary in the recovery process to compress the chlorine-containing gases, for example to a pressure in the range 5 to 14, and preferably to one in the range 6.7 to 7.5 bars, absolute. This may be done either before or after the potentially solid and liquid-forming gases have been removed from the tail gases. It is preferred to compress the gases before the removal of the solid and liquid-forming gases.

It is preferred to obtain the necessary compression by means of a turbo-type compressor (which may be of the centrifugal or centrifugal/axial type) or by a screw type compressor since reciprocating-type compressors can cause stability problems in the subsequent processing steps. It is also desirable that contact between the gases and lubricants should be avoided.

After removal of these compounds and compression of the chlorine-containing gas mixture, the compressed gas is passed to one stream of a multi-stream heat exchanger. Such multi-stream heat exchangers are of the type through which it is possible to pass several, for example up to six, different gases or gas mixtures in efficient heat-exchange relationship with each other while maintaining the gas streams physically separate. Such heat exchangers are known in the art and are often of the so-called "plate and fin" type.

The multi-stream heat exchanger is operated in such a manner that the compressed and purified tail gas is cooled in the heat exchanger to a temperature below the dew point of the chlorine in the gas mixture but not to a temperature below $-101°$ C. Preferred temperatures to which the gas is cooled are in the range $-60°$ C. to $-97°$ C. and particularly in the range $-85°$ C. to $-95°$ C. The means whereby the desired temperature in the heat exchanger is obtained will be apparent from the following description of the subsequent processing steps.

The cooled and compressed chlorine-containing gas mixture, (in which the greater part of the chlorine is now in the liquid phase) is withdrawn from the heat exchanger and the gaseous and liquid phases are separated, for example in suitable phase separator of "knock-out pot" maintained substantially at the pressure to which the gas mixture was initially compressed.

The greater part of the cooled liquid chlorine, for example at a temperature in the range −85° C. to −95° C., is removed from the phase separator and is separately recycled through the heat-exchanger in heat exchange contact with incoming compressed and purified tail gas and is, itself, heated and thereby converted to gaseous chlorine of high purity, for example in excess of 97 to 98% by volume. The gaseous chlorine thus formed may be recycled, for example for use in the chlorination of more metal-containing material to form metal halide for subsequent oxidation. In the case of the 'chloride' process for the production of pigmentary titanium dioxide the chldorine is normally re-used in the chlorination of an iron-containing titaniferous material such as ilmenite, leucoxene or mineral rutile to form titanium tetrachloride.

Part of the cooled and compressed gas phase from the phase separator is also removed from the separator and circulated separately through the heat exchanger in heat exchanger contact with the incoming tail gas thereby also assisting in the cooling of the latter gas. The heated gas mixture thus formed is withdrawn from the heat exchanger, is cooled externally and is recirculated separately once more through the heat exchanger. The heated gas mixture thus produced is either discharged to atmosphere, after purification if necessary, or is re-utilised, before or after storage.

The gas from the phase separator prior to entering the heat exchanger is normally at a temperature in the range of about −60° C. to −97° C. and preferably one in the range −85° C. to −95° C. During its circulation through the heat exchanger it may be heated, for example to a temperature in the range −10° C. to −50° C. This gas, after withdrawal from the heat exchanger, is externally cooled to a temperature which is below that to which the compressed and purified tail gas is cooled in its passage through the heat exchanger but, again, the temperature of the cooled gas should not fall below −101° C. before recirculating through the heat exchanger prior to discharge or re-use.

The preferred means for externally cooling the gas is a turbo-expander. Such devices are known in the prior art for cooling compressed gases. During cooling the gas is allowed to expand and, in addition to the cooling obtained thereby, it may be possible to recover useful work, for example the turbo-expander may be used to drive a recycle compressor. The process of this invention is not, however, limited to the use of a turbo-expander in the cooling of the gas and conventional methods of cooling may be applied, if desired.

In addition to the gas streams separately recirculated through the heat exchanger as described above, a mixture of liquid chlorine and its associated gas phase from the separator is also recirculated separately through the heat exchanger to provide additional cooling capacity therein. The composition of the chlorine/gas mixture passed through the heat exchanger will depend to some extent on the pressure at which this mixture is introduced into the heat exchanger. For example, at pressures in the range 1.3 to 2.5 bar absolute it is convenient that the mixture should contain between about 55 and 75% by volume of chlorine. It is preferred to introduce the chlorine/gas mixture into the heat exchanger at a pressure in the range 1.5 to 2.0 bars absolute and to ensure that the chlorine content of the mixture is in the range 60 to 70% by volume.

The chlorine/gas mixture is, of course, heated in the heat exchanger (thereby assisting in the cooling of the incoming compressed and purified tail gas) and is withdrawn from the heat exchanger as a gaseous mixture. This mixture may, if desired, be recompressed and mixed with fresh tail gas to be treated, either before or after purification and compression of the tail gas, and passed with the latter through the heat exchanger to be separated once more into its separate phases. Alternatively, the gas mixture may be compressed and recirculated separately through the heat exchanger to the phase separator wherein it is again separated into liquid and gas phases.

The diagrammatic drawing accompanying this specification shows one embodiment of the process of the present invention.

The chlorine-containing gas feed 19 is first compressed in a compressor 20 and then gases which, if present in the gas mixture in substantial quanity, would form solids or which would liquify with chlorine in the subsequent process steps are removed in a purification step shown generally as block 21.

Compressed and purified chlorine-containing tail gas passes through pipe 1 to the multi-stream heat exchanger 2 and continues separately through channel 3 in the heat exchanger wherein it is in efficient heat exchange contact with channels 4, 5, 6 and 7 through which other gas streams pass, as described below.

During passage through 3 the gas is cooled and liquid chlorine is formed. The mixture passes to phase separator 8 wherein liquid and gas phases separate.

Liquid chlorine from the phase separator passes to channel 4 wherein it is heated and vapourised and passed to storage (not shown).

Cooled and compressed gas from the phase separator passes through channel 5 and is heated before being withdrawn through pipe 9 to turbo-expander 10 wherein the gas is allowed to expand and is cooled. As the gas expands work is carried out and turbine wheel 11 is rotated and may be used to drive a gas blower (not shown). The cooled gas passes via pipe 12 to channel 6 of the heat exchanger before being discharged through pipe 13. Part of the liquid and gas in the phase separator are withdrawn through pipes 14 and 15, mixed, expanded in expansion valves 22 and 23 and supplied to channel 7 of the heat exchanger before being withdrawn via pipe 16, compressed in compressor 17, cooled in cooler 18 and mixed with incoming compressed and purified tail gas in pipe 1 prior to return to the heat exchanger through channel 3.

EXAMPLE

Tail gas from the 'chloride' process for the production of pigmentary titanium dioxide has the following properties

| (a) Pressure | 1.035 bars (abs) |
|---|---|
| (b) Temperature | 40° C |
| (c) Analyses | $Cl_2$ 66.15% |
| | $O_2$ 26.05% |

| | |
|---|---|
| -continued | |
| Inert gases | 7.8% |

The gas is compressed to 7.0 bars absolute in a centrifugal compressor and is cooled in a multiple-stream heat exchanger to −90° C. at which temperature approximately 99% of its chlorine content is condensed to the liquid phase. The mixture is then transferred to a phase separator.

The greater part of the liquid phase (consisting mainly of chlorine) is removed and its pressure reduced to about 1.25 bar absolute before being passed through the heat exchanger. The resulting warmed gaseous chlorine is then passed to storage after further compression.

The greater part of the gas phase from the phase separator (mainly oxygen, inert gases and some chlorine) is recirculated through the heat exchanger and is withdrawn therefrom at about −32° C. before passing to a turbo-expander wherein the pressure of the gas is reduced to about 1.4 bars absolute and its temperature is reduced to about −97° C. The expansion of the gas in the turbo expander may provide useful work, for example in the operation of a gas blower. The cold gas from the turbo-expander is again recirculated through the heat-exchanger before discharge therefrom.

A mixture of liquid chlorine and cold gas phase from the phase separator is produced, the ratio of the two components being 1.94:1.0, and the pressure of the mixture being about 1.9 bars absolute. The resulting cold gas mixture is recirculated through the heat exchanger, recovered therefrom, compressed, cooled, mixed with fresh incoming compressed tail gas and supplied to the multi-stream heat exchanger as previously described.

When compared with the process described in British Pat. No. 1,274,710 it is calculated that on a commercial scale operation the operating costs of the present invention may be less than 50% of those entailed in the process of British Pat. No. 1,274,710 and an even greater reduction in such costs can be obtained by the process of the present invention when compared with the operating costs of the previously used compression/refrigeration processes for the recovery of chlorine.

What is claimed is:

1. Process for the recovery of chlorine from chlorine-containing gases comprising the following steps:
    (a) removing from the chlorine-containing gas mixture, either before or after step (b) below gases which, if present in the gas mixture in substantial quantity, would form solids or would liquify with chlorine in the subsequent process steps;
    (b) compressing the chlorine-containing gas mixture;
    (c) cooling the compressed gas mixture in a multi-stream heat exchanger to a temperature below the dew-point of chlorine in the gas mixture but not below −101° C. to form a cooled mixture of gas and liquid chlorine;
    (d) withdrawing said cooled mixture from the heat exchanger and separating said mixture into a liquid chlorine fraction and a gas fraction;
    (e) recirculating a portion of said liquid chlorine fraction from (d) separately through the heat exchanger and recovering therefrom chlorine;
    (f) circulating a portion of said separated gas fraction from step (d) through the heat exchanger, withdrawing the resulting heated gas, externally cooling the gas to a temperature below that obtained in step (c) above but not below −101° C. and thereafter recirculating the cooled gas through the heat exchanger;
    (g) passing through the heat exchanger a mixture of predetermined composition of said gas and liquid chlorine fractions from step (d) above, withdrawing the resulting heated gas mixture from the heat exchanger, compressing the heated mixture and returning the compressed mixture to the gas/liquid phase separator of step (d) via the multi-stream heat exchanger.

2. A process as claimed in claim 1 wherein the chlorine-containing gases are tail gases from the chloride process for the production of titanium dioxide.

3. A process as claimed in claim 1 wherein the chlorine-containing gases are treated as in step (a) to remove gases selected from the group consisting of carbon dioxide, metal halide vapour, and hydrocarbon gases.

4. A process as claimed in claim 1 wherein the chlorine-containing gas mixture in step (b) is compressed to a pressure in the range 5 to 14 bars absolute.

5. A process as claimed in claim 4 wherein the chlorine-containing gas mixture is compressed to a pressure in the range 6.7 to 7.5 bars absolute.

6. A process as claimed in claim 1 wherein the chlorine-containing gas mixture in step (b) is compressed prior to the removal of potentially solid—or liquid—forming gases.

7. A process as claimed in claim 1 wherein the compressed chlorine-containing gas mixture of step (c) is cooled in the heat exchanger to a temperature in the range −60° C. to −97° C.

8. A process as claimed in claim 7 wherein the gas mixture is cooled to a temperature in the range −85° C. to −95° C.

9. A process as claimed in claim 1 wherein the cooled and separated gas in step (f), prior to entering the heat exchanger, is at a temperature in the range −60° C. to −97° C.

10. A process as claimed in claim 9 wherein the gas fraction is at a temperature in the range −85° C. to −95° C.

11. A process as claimed in claim 1 wherein the cooled and separated gas in step fraction (f) is heated to a temperature in the range −10° C. to −50° C. prior to withdrawal from the heat exchanger.

12. A process as claimed in claim 1 wherein the gas withdrawn from the heat exchanger in step (f) is cooled in a turbo-expander.

13. A process as claimed in claim 1 wherein the mixture of gas and liquid chlorine fractions of step (g), prior to introduction into the heat exchanger, is at a pressure in the range 1.3 to 2.5 bars absolute and contains between 55 and 75% by volume of chlorine.

14. A process as claimed in claim 14 wherein the mixture of gas and liquid chlorine fractions is at a pressure in the range 1.5 to 2 bars absolute and has a chlorine content in the range 60 to 70% by volume.

* * * * *